United States Patent
Lindem, III et al.

(10) Patent No.: US 9,225,629 B2
(45) Date of Patent: Dec. 29, 2015

(54) EFFICIENT IDENTIFICATION OF NODE PROTECTION REMOTE LFA TARGET

(71) Applicant: Telefonaktiebolaget L M Ericsson (publ), Stockholm (SE)

(72) Inventors: Alfred C. Lindem, III, Cary, NC (US); Lars Ernstrom, Palo Alto, CA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 60 days.

(21) Appl. No.: 14/292,516

(22) Filed: May 30, 2014

(65) Prior Publication Data

US 2015/0350062 A1    Dec. 3, 2015

(51) Int. Cl.
 G01R 31/08    (2006.01)
 H04L 12/705   (2013.01)
 H04L 12/707   (2013.01)

(52) U.S. Cl.
 CPC .............. H04L 45/18 (2013.01); H04L 45/22 (2013.01)

(58) Field of Classification Search
 CPC ...................................................... H04L 45/00
 USPC ........................................................ 370/220
 See application file for complete search history.

(56) References Cited

FOREIGN PATENT DOCUMENTS

WO    2009126390 A1    10/2009

OTHER PUBLICATIONS

Ali, Z., et al., "Node-IDS Based Resource Reservation Protocol (RSVP) Hello: A Clarification Statement", Network Working Group; RFC 4558; Jun. 2006; 7 pages.
Andersson, L., et al., "LDP Specification", Network Working Group; RFC 5036; Oct. 2007; 135 pages.
Atlas, A., et al., "Basic specification for IP fast reroute: loop-free alternates", Network Working Group, Request for Comments: 5286, Sep. 2008, 31 pages.
Awduche, D., et al., ""RSVP-TE: Extensions to RSVP for LSP Tunnels,"", Network Working Group; RFC 3209; Dec. 2001; 61 pages.
Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.

(Continued)

*Primary Examiner* — Samina Choudhry
(74) *Attorney, Agent, or Firm* — Nicholson De Vos Webster & Elliott LLP

(57) ABSTRACT

A method is implemented by a network device to improve efficiency of computing a node-protecting remote loop-free alternate (LFA) in a network topology graph. The method computes a reverse shortest path first (SPF) algorithm rooted at the primary next hop node, where the reverse SPF algorithm rooted at the primary next hop maintains a reverse path of a shortest path computed by the reverse SPF algorithm rooted at the primary next hop node. The method selects a node that is in both the source node's node-protecting extended P-space that protects the primary next hop node and the primary next hop node's link-protecting Q-space that protects the S-E link. The method traverses the reverse path of the shortest path computed by the reverse SPF algorithm rooted at the primary next hop node starting from the selected node and towards the primary next hop node and assigns the selected node as a node-protecting remote LFA for each S-E destination node visited along the traversal of the reverse path that has not been assigned a node-protecting remote LFA.

25 Claims, 8 Drawing Sheets

(56) References Cited

OTHER PUBLICATIONS

Baker, F., et al., "Management Information Base for the Differentiated Services Architecture", Network Working Group, Request for Comments: 3289, The Internet Society, (May 2002), 116 pages.
Berger, L., "Generalized Multi-Protocol Label Switching (GMPLS) Signaling Resource ReSerVation Protocol-Traffic Engineering (RSVP-TE)", Network Working Group; RFC 3473; Jan. 2003; 42 pages.
Bernet, Y., et al., "An Informal Management Model for Diffserv Routers", Network Working Group; RFC 3290; May 2002; 56 pages.
Black, D., "Differentiated Services and Tunnels", Network Working Group; RFC 2983; Oct. 2000; 14 pages.
Black, D., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group, Request for Comments: 2675, Aug. 1999, 9 pages.
Braden, R., et al., "Resource ReSerVation Protocol (RSVP) Version 1 Functional Specification", Network Working Group, Request for Comment: 2205, Sep. 1997, 112 pages.
Chan, K., et al., "Differentiated Services Quality of Service Policy Information Base", Network Working Group; RFC 3317; Mar. 2003; 96 pages.
Charny, A., et al., "Supplemental Information for the New Definition of the EF PHB (Expedited Forwarding Per-Hop Behavior)", Network Working Group; RFC 3247; Mar. 2002; 24 pages.
Davie, B., et al., "An Expedited Forwarding PHB (Per-Hop Behavior)," Mar. 2002, 16 pages, Network Working Group, Request for Comments: 3246, The Internet Society.
Deering, S., et al., "Internet Protocol, Version 6 (IPv6) Specification", Network Working Group, Request for Comments: 2460, Dec. 1998, 39 pages.
Eggert, L., et al., "Unicast UDP Usage guidelines for Application Designers", Network Working Group; RFC 5405; Nov. 2008; 27 pages.
Fenner, B., et al., "Management information base for the user datagram protocol (UDP)", Network Working Group, Request for Comment: 4113, Jun. 2005, 19 pages.
Grossman, D., "New Terminology and Clarifications for Diffserv", Network Working Group; RFC 3260; Apr. 2002; 10 pages.
Heinanen, J., et al., "Assured Forwarding PHB Group", Network Working Group; RFC 2597; Jun. 1999; 11 pages.
Hendrick, C., "Routing Information Protocol", Network Working Group, Request for Comment: 1058, Jun. 1988, 33 pages.
Hopps, C., "Analysis of an Equal-Cost Multi-Path Algorithm", Network Working Group; RFC 2992; Nov. 2000; 8 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Information Sciences Institute, University of Southern C., "Transmission control protocol darpa internet program protocol specification", Sep. 1981, Request for Comments: 793, 91 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., "RIP Version 2", Network Working Group, Request for Comment: 2453, Nov. 1998, 39 pages.
Malkin, G., et al., "RIPng for IPv6", Network Working Group; RFC 2080; Jan. 1997; 19 pages.
Moy, J., "OSPF Version 2", Network Working Group, Request for Comments: 2328, Apr. 1998, 244 pages.
Nichols, K., et al., "Definition of Differentiated Services Per Domain Behaviors and Rules for their Specification", Network Working Group; RFC 3086; Apr. 2001; 24 pages.
Nichols, K., et al., "Definition of the Differentiated Services Field (DS Field) in the IPv4 and IPv6 Headers", Network Working Group; RFC 2474; Dec. 1998; 20 pages.
Oran, D., "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495; May 2006; 21 pages.
Postel, J., "User Datagram Protocol", Aug. 28, 1980, 3 pages, RFC 768.
Rekhter, Y., et al., "A Border Gateway Protocol 4 (BGP-4)", Network Working Group; RFC 4271; Jan. 2006; 104 pages.
Rosen, et al., "BGP/MPLS IP Virtual Private Networks (VPNs)", Network Working Group, Request for Comments: 4364, The Internet Society, (Feb. 2006), 47 pages.
Shenker, S., et al., "Specification of Guaranteed Quality of Services", Network Working Group; RFC 2212; Sep. 1997; 20 pages.
Socolofsky, T., et al., "A TCP/IP Tutorial", Network Working Group; RFC 1180; Jan. 1991; 28 pages.
Thaler, D., et al., "Multipath Issues in Unicast and Multicast Next-Hop Selection", Network Working Group; RFC 2991; Nov. 2000; 9 pages.
Wroclawski, J., "Specification of the Controlled-Load Network Element Service", Network Working Group; RFC 2211; Sep. 1997; 19 pages.
Wroclawski, J., "The Use of RSVP with IETF Integrated Services", Network Working Group; RFC 2210; Sep. 1997; 33 pages.
Atlas, A., et al., "Basic Specification for IP Fast Reroute: Loop-Free Alternates", *Standards Track; Request for Comments*: 5286; Sep. 2008. 31 pages.
Bryant, S., et al., "Remote LFA FRR draft-ietf-rtgw-remote-lfa-04", Standards Track; http://tools.ietf.org/html/draft-ietf-rtgwg-remote-lfa-04; Nov. 2013; 24 pages.
Sarkar, P., et al., "Remote-LFA Node Protection and Manageability draft-psarkar-rtgwg-rfla-node-protection-02", *Routing Area Network Group*; http://tools.ietf.org/html/draft-ietf-rtgwg-remote-lfa-04#ref-I-D.psarkar-rtqwq-rfla-node-protection; Nov. 2013; 15 pages.

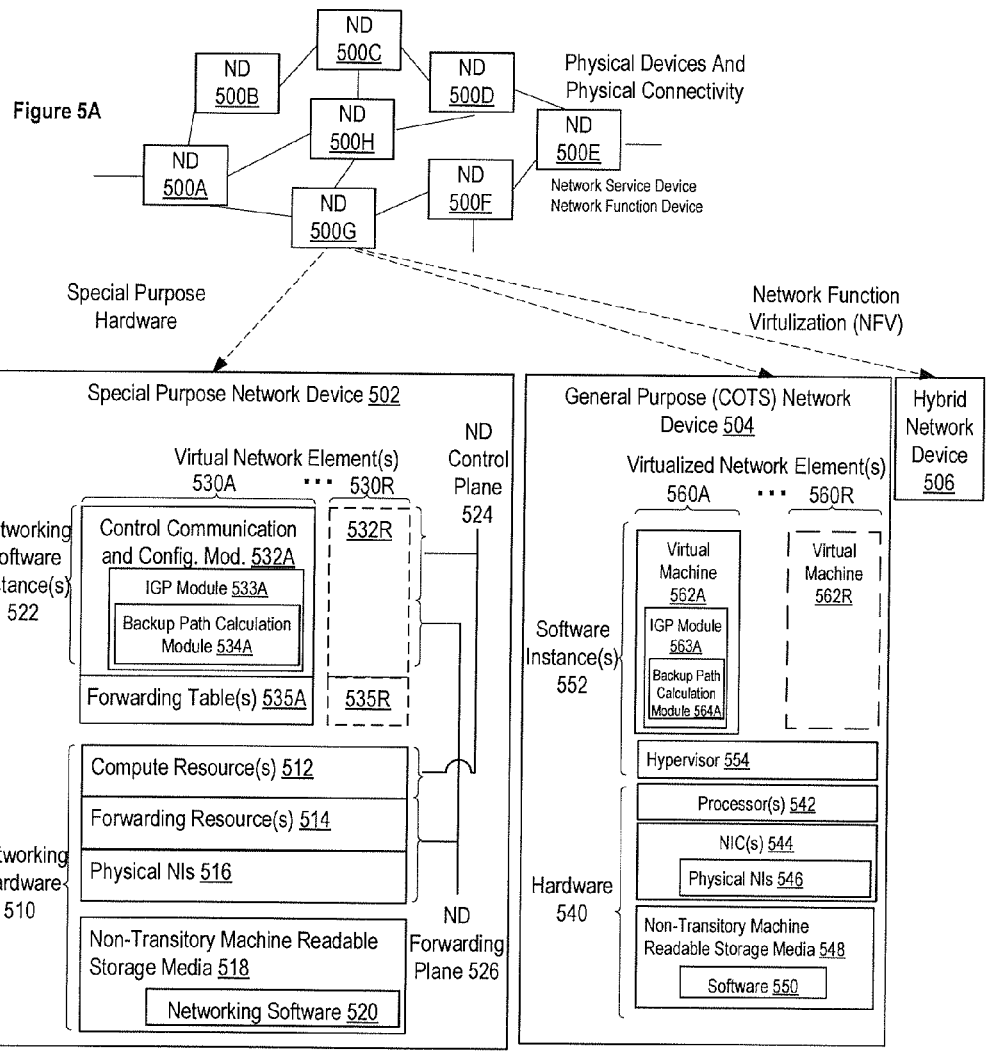

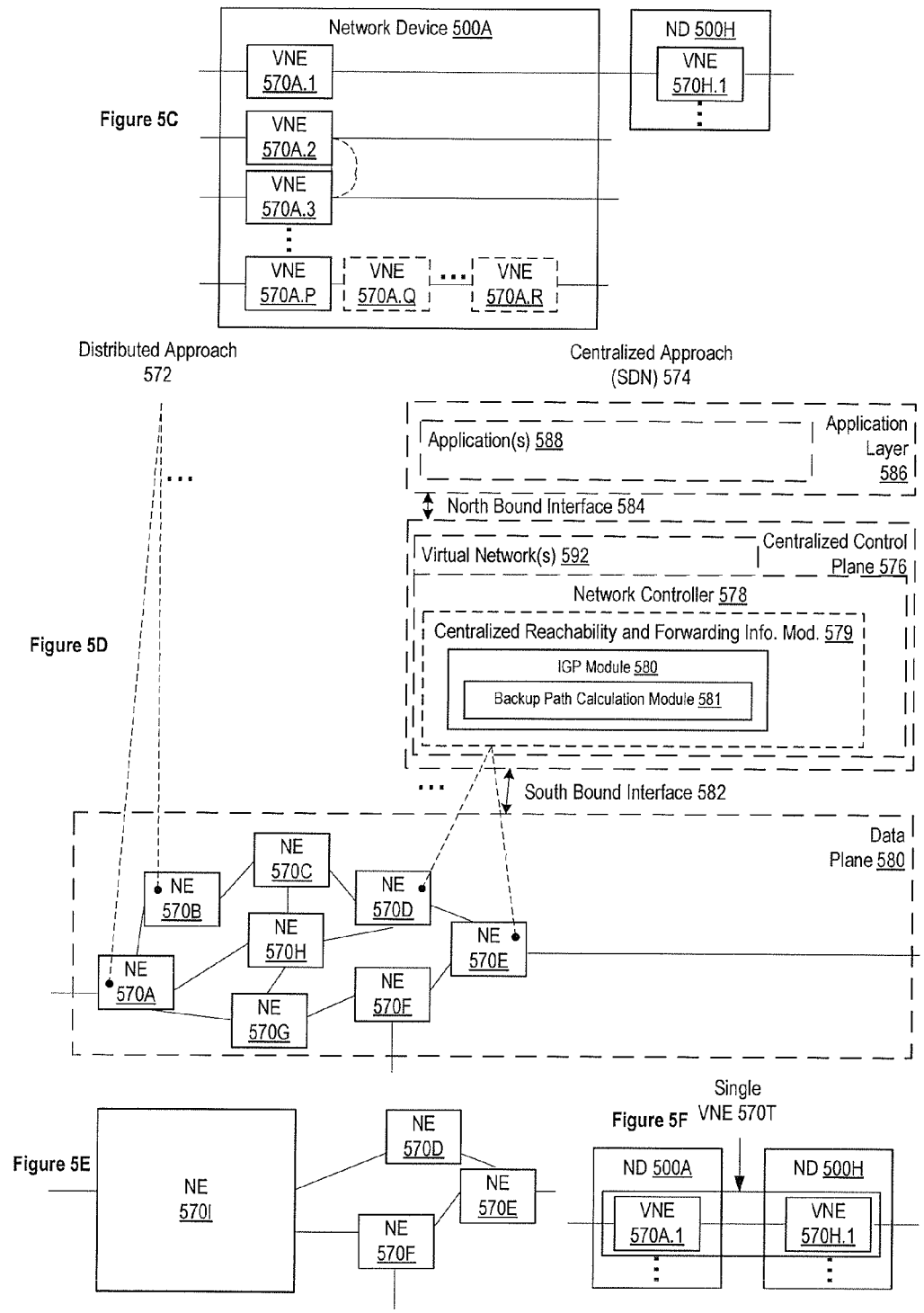

EFFICIENT IDENTIFICATION OF NODE PROTECTION REMOTE LFA TARGET

FIELD

Embodiments of the invention relate to the field of network routing. More specifically, the embodiments relate to the efficient computation of remote loop-free alternate (LFA) routes.

BACKGROUND

Internet Protocol (IP) traffic can be routed across the Internet by using discovery and routing protocols that are executed by the nodes of the Internet such that they can determine optimal and loop-free routes from any data traffic source to any data traffic destination using topology information exchanged between the nodes. The process of arriving at these routes and forwarding tables can be called "convergence." The routes and forwarding tables are recalculated when there is a change in network topology. However, re-calculating these routes and tables can take time (i.e., long convergence time) during which some traffic may be dropped or lost.

IP and Multi-Protocol Label Switching (MPLS) Fast Reroute (FRR) technologies address the problem with the long convergence of routing protocols by providing pre-calculated backup paths, which are used when network failures occur. These technologies are important due to the increased use of IP transport for real time services such as video, voice, television, and the increasing number of web services which are all expected to work without disruption.

The standard approach used in existing technologies, such as Open Shortest Path First (OSPF)/Intermediate System-Intermediate System (IS-IS)/Label Distribution Protocol (LDP) Loop-Free Alternate (LFA), Maximally Redundant Trees (MRT), and Border Gateway Protocol (BGP) Fast Reroute (FRR) is to gather network information using a routing/signaling protocol and based on that information compute the backup paths necessary to prepare for failures of adjacent links or nodes, and then to pre-provision the forwarding plane with those back-up paths. The forwarding plane is then able to react on a failure event and switch from a primary path to a back-up path without waiting for the routing protocol to gather updated network information and converge.

SUMMARY

A method is implemented by a network device to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node. The method computes a reverse shortest path first (SPF) algorithm rooted at the primary next hop node, where the reverse SPF algorithm rooted at the primary next hop maintains a reverse path of a shortest path computed by the reverse SPF algorithm rooted at the primary next hop node. The method selects a node that is in both the source node's node-protecting extended P-space that protects the primary next hop node and the primary next hop node's link-protecting Q-space that protects the S-E link, traverses the reverse path of the shortest path computed by the reverse SPF algorithm rooted at the primary next hop node starting from the selected node and towards the primary next hop node, and assigns the selected node as a node-protecting remote LFA for each S-E destination node visited along the traversal of the reverse path that has not been assigned a node-protecting remote LFA.

A network device is configured to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node, the primary next hop node having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node. The network device includes a forwarding element to forward data traffic towards a primary next hop node until a network event and to forward the data traffic towards the node-protecting remote LFA after the network event. The network device further includes a network processor coupled to the at least one forwarding element, the network processor configured to execute a backup path calculation module. The backup path calculation module is configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

A non-transitory computer readable medium has instructions stored therein, which when executed causes a network device to compute a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node. The execution causes the network device to perform a set of operations including computing a reverse shortest path first (SPF) algorithm rooted at the primary next hop node, where the reverse SPF algorithm rooted at the primary next hop maintains a reverse path of a shortest path computed by the reverse SPF algorithm rooted at the primary next hop node, selecting a node that is in both the source node's node-protecting extended P-space that protects the primary next hop node and the primary next hop node's link-protecting Q-space that protects the S-E link, traversing the reverse path of the shortest path computed by the reverse SPF algorithm rooted at the primary next hop node starting from the selected node and towards the primary next hop node, and assigning the selected node as a node-protecting remote LFA for each S-E destination node visited along the traversal of the reverse path that has not been assigned a node-protecting remote LFA.

A control plane device is configured to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node. The control plane device includes a storage medium to store centralized control plane software, a backup path calculation module and a local routing information base (RIB). The control plane device further includes a processor communicatively coupled to the storage medium. The processor is configured to execute the control plane software. The control plane software is configured to implement the backup path calculation module. The backup path calculation module is configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

A computing device implementing a plurality of virtual machines for implementing network function virtualization (NFV), wherein a virtual machine from the plurality of virtual machines is configured to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node. The computing device includes a storage medium to store a backup path calculation module and a local routing information base (RIB), and a processor communicatively coupled to the storage medium. The processor is configured to execute the virtual machine, where the virtual machine is configured to implement the backup path calculation module. The backup path calculation module is configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement the special-purpose network device according to some embodiments of the invention.

FIG. 5C illustrates various exemplary ways in which virtual network elements (VNEs) may be coupled according to some embodiments of the invention.

FIG. 5D illustrates a network with a single network element (NE) on each of the NDs of FIG. 5A, and within this straight forward approach contrasts a traditional distributed approach (commonly used by traditional routers) with a centralized approach for maintaining reachability and forwarding information (also called network control), according to some embodiments of the invention.

FIG. 5E illustrates the simple case of where each of the NDs implements a single NE, but the centralized control plane has abstracted multiple of the NEs in different NDs into (to represent) a single NE in one of the virtual network(s) of FIG. 5D, according to some embodiments of the invention.

FIG. 5F illustrates a case where multiple VNEs are implemented on different NDs and are coupled to each other, and where the centralized control plane has abstracted these multiple VNEs such that they appear as a single VNE within one of the virtual networks of FIG. 5D, according to some embodiments of the invention.

DESCRIPTION OF EMBODIMENTS

Figure 1:
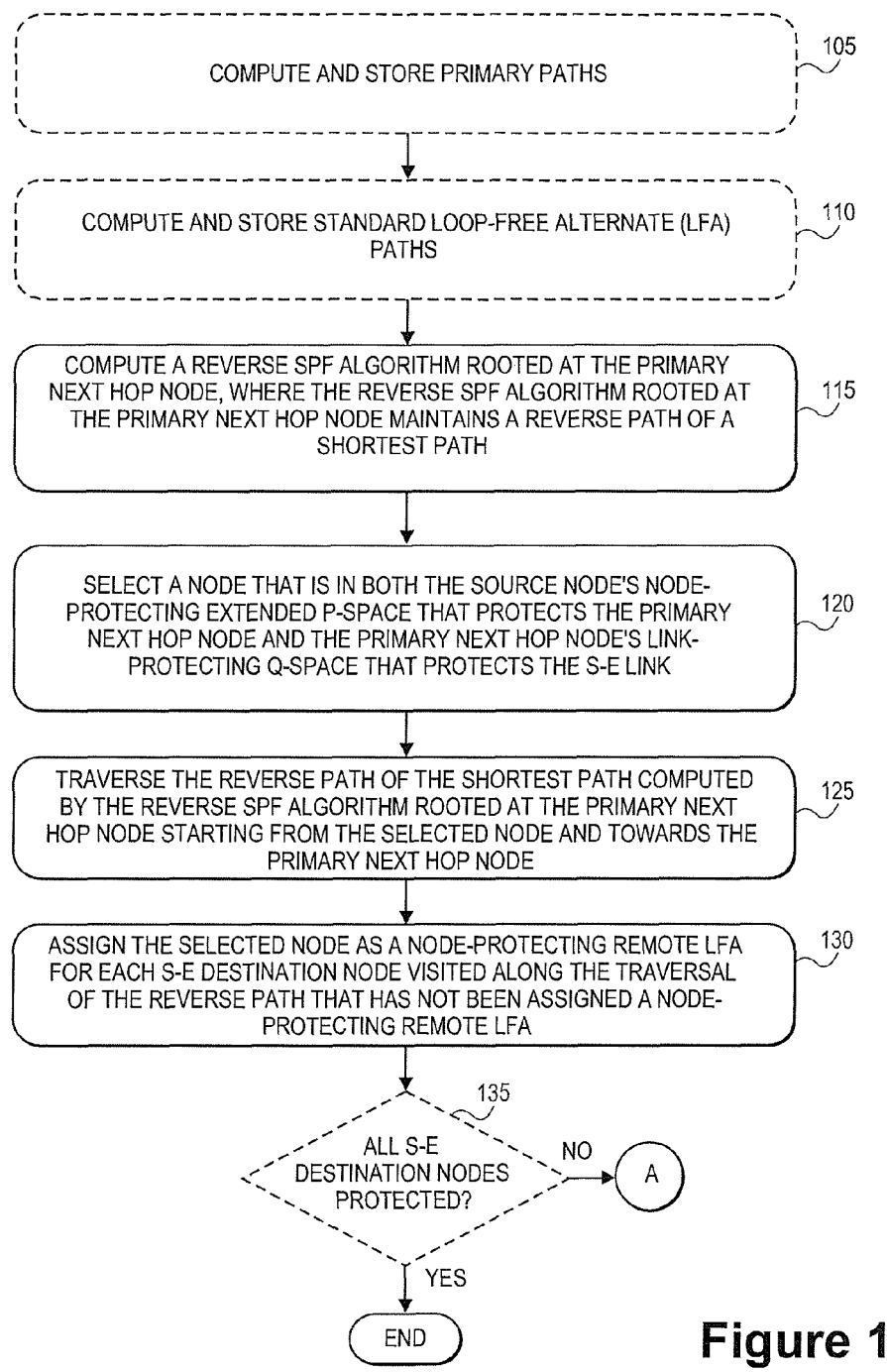
FIG. 1 is a flowchart of one embodiment of a process for computing node-protecting remote LFA in a network topology graph.
Figure 1:
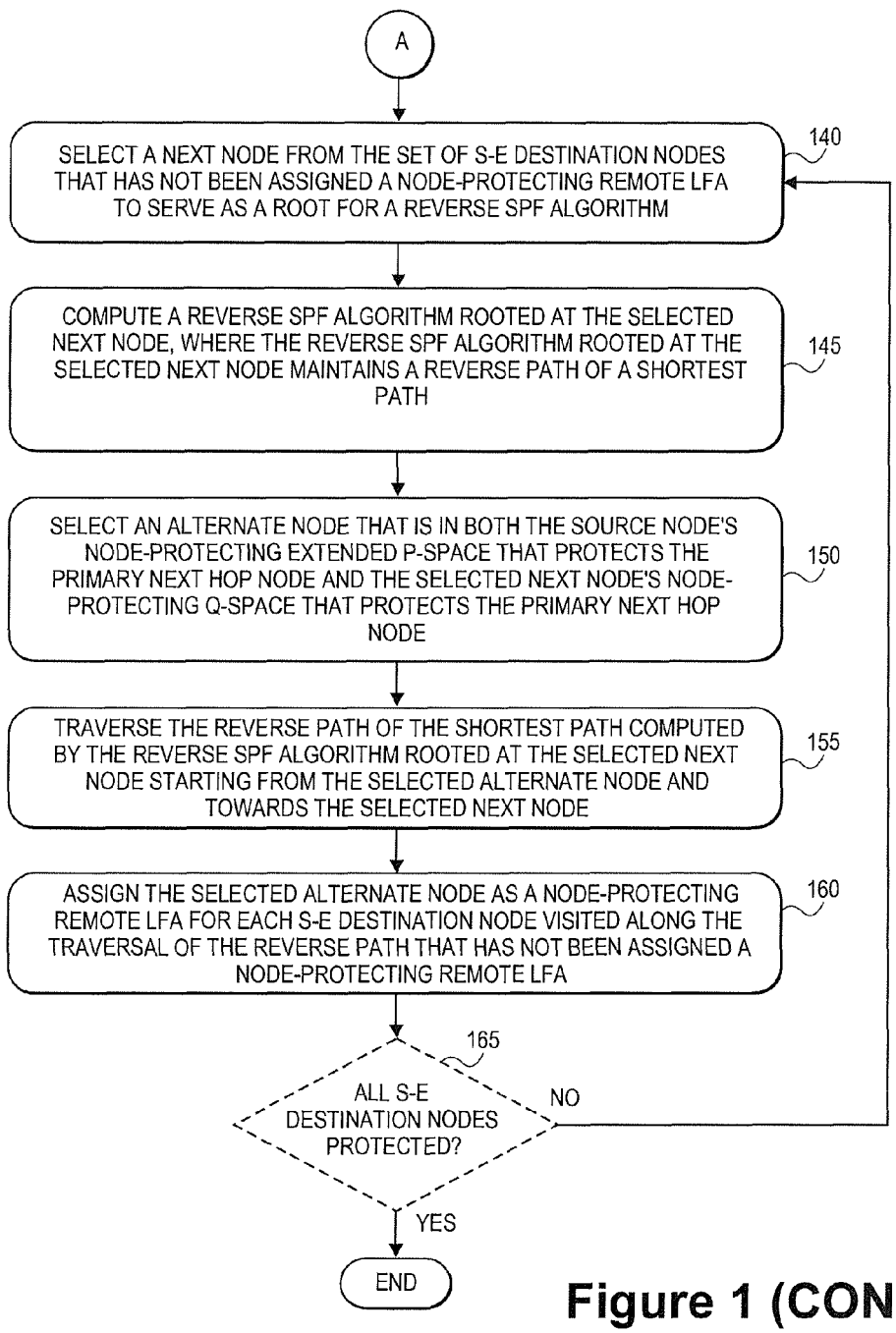

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

The embodiments of the invention described herein below provide a method and apparatus for use in connection with Fast Reroute (FRR) for Internet Protocol (IP) and multi-protocol label switching (MPLS), or other addressing scheme used for communication in a data network. IP and MPLS Fast Reroute technologies address the problem with the long convergence time of routing protocols. The problem is addressed by providing backup paths, which are used when network failures occur. These technologies are important due to the increased use of IP transport for real time services such as video, voice and TV and the increasing number of web services which are all expected to work without disruption.

The standard approach used in existing technologies, such as OSPF/ISIS/LDP LFA, MRT, BGP FRR, is to gather network information using a routing/signaling protocol and based on that information compute the backup paths necessary to prepare for failures of adjacent links or nodes, and then to pre-provision the forwarding plane with those backup paths. The forwarding plane is then able to react on a failure event and switch from a primary path to a backup path without waiting for the routing protocol to gather updated network information and converge.

Existing Fast rerouting (FRR) technologies include the calculation of Loop-Free Alternate (LFA) backup paths and remote LFA backup paths. LFA backup paths use a neighbor node as a backup, while remote LFA backup paths use a remote node, typically connected through a tunnel, as a backup. These technologies provide Fast Reroute based on information obtained from Interior Gateway Protocols (IGPs) such as Open Shortest Path First (OSPF) and Intermediate System-Intermediate System (IS-IS) protocols. An IGP running within a network element builds a database (e.g., a routing information base (RIB)), which tracks all links within the applicable network area. The information obtained from the IGP is used to construct a network topology graph of the network, which can be used to compute primary paths and backup paths.

A network topology graph represents a topology of a network where each node or router in the network is represented as a vertex in the graph and communication links between the nodes or routers are represented as directed edges between the vertices. As used herein, the computing node (i.e., source node) is denoted as S and the destination under consideration is denoted as D. The primary next hop for the destinations that are being protected is denoted as E. The link that connects S and E is denoted as the S-E link. A neighbor of S other than E is denoted as N.

LFA backup paths use a neighbor node, N, as a next hop. In general, N can provide a LFA for a source node, S, to reach a destination node, D, if and only if the following inequality is satisfied: Dist_Opt(N, D)<Dist_Opt(N, S)+Dist_Opt(S, D). As used herein, Dist_Opt(U, V) denotes the optimal or shortest path graph distance from vertex U to vertex V. The Dist_Opt(S, D) metric is normally available from the regular shortest path first (SPF) calculation performed by the link-state routing protocols. The Dist_Opt(N, D) and Dist_Opt(N, S) metrics can be obtained by performing additional SPF calculations from the perspective of each neighbor. Satisfying this inequality ensures that once traffic is forwarded to the neighbor node (i.e., node N), the traffic can reach the destination using pre-failure forwarding information without returning back to S. As such, when the primary path to reach D fails, the source router can forward traffic towards N to reach D. LFA FRR is described in more detail in Request for Comment (RFC) 5286, which is hereby incorporated by reference.

Remote LFA backup paths use a remote node, rather than a neighbor node, as a next hop. In other words, a remote LFA backup path sends traffic to some staging point in the network from which it is assumed that, in the absence of multiple failures, the traffic will travel to its destination using normal forwarding without looping back to S. Consider an arbitrary protected link S-E. In LFA FRR, if a path to the destination from a neighbor of S does not cause a packet to loop back over the S-E link (i.e., N is a LFA), then S can send the packet to N and the packet will be delivered to the destination using the pre-failure forwarding information. If there is no such LFA neighbor, then S may be able to create a virtual LFA by using a tunnel to carry the packet to a point in the network that is not a direct neighbor of S, from which traffic will be delivered to the destination without looping back to S. Such a tunnel will be referred to herein as a repair tunnel and the tail-end of the repair tunnel is called a PQ node.

The repair tunnel endpoint needs to be a node in the network reachable from S without traversing the S-E link. In addition, the repair tunnel end point needs to be a node from which traffic will normally flow towards the destination without transiting the failed S-E link. This ensures that once traffic is released from the repair tunnel (i.e., at the repair tunnel endpoint), traffic will be forwarded, as normal, on the shortest path from the release point to its destination D.

A repair tunnel endpoint can be computed by determining the set of nodes which can be reached from S without traversing the S-E link and then matching this set with the set of nodes that can reach E, using normal forwarding, without traversing the S-E link. The set of nodes that can be reached from S without traversing the S-E link is called node S's link-protecting P-space with respect to the S-E link (i.e., protects the S-E link). It is to be noted that S can also use the link-protecting P-space of its neighbors since S can determine which neighbor it will use as the next hop for the repair. The union of the link-protecting P-space of each of S's neighbors (excluding E) is called node S's extended link-protecting P-space with respect to the S-E link. The use of an extended P-space allows for greater repair coverage. The set of nodes that can reach E, using normal forwarding, without traversing the S-E link is called the link-protecting Q-space of E with respect to the S-E link. A node that is in both the link-protecting extended P-space of S with respect to the S-E link and the link-protecting Q-space of E with respect to the S-E link can serve as a repair tunnel endpoint. Such a node will be referred to herein as a link-protecting PQ-node.

The link-protecting P-space of S with respect to the S-E link can be obtained by computing a shortest path tree (SPT) rooted at S and excising the sub-tree reached via the S-E link (including those which are members of an Equal Cost Multiple Path). The SPT can be computed by using Djikstra's algorithm or any adequate SPF algorithm. For example, an SPT rooted at S can be computed by performing an SPF algorithm from S (i.e., SPF rooted at S). Expressed in cost terms, a node, P, is in S's link-protecting P-space with respect to the S-E link if $Dist\_Opt(S, P) < Dist\_Opt(S, E) + Dist\_Opt(E, P)$.

The link-protecting extended P-space of S with respect to the S-E link is the union of the P-spaces of each of S's neighbors. This can be calculated by computing an SPT rooted at each of S's neighbors (excluding E) and excising the subtree reached via the path $N \rightarrow S \rightarrow E$. The SPT rooted at a neighbor yields the shortest path from the neighbor to each other node in the network. The forward SPT can be computed by using Djikstra's algorithm or any adequate SPF algorithm. For example, an SPT rooted at a neighbor node can be computed by performing an SPF algorithm from that neighbor node (i.e., SPF rooted at the neighbor node). The use of an extended P-space may allow node S to reach potential repair tunnel end points that were otherwise unreachable using only S's P-space. Expressed in cost terms, a node, P, is in S's link-protecting extended P-space with respect to the S-E link if $Dist\_Opt(N, P) < Dist\_Opt(N, S) + Dist\_Opt(S, E) + Dist\_Opt(E, P)$. In other words, once the traffic is forced to N by S, it is lower cost for the traffic to continue on to P by any path other than a path that takes it back to S and then across the S-E link.

The link-protecting Q-space of E with respect to the S-E link can be obtained by computing a reverse SPT rooted at E, with the sub-tree which traverses the failed link excised (including those which are members of an Equal Cost Multiple Path (ECMP)). The reverse SPT yields the shortest path towards the root from other nodes in the network. The reverse SPT rooted at E can be computed by using a reverse SPF algorithm from E (i.e., reverse SPF rooted at E). A reverse SPF algorithm operates in a similar fashion to a forward SPF algorithm except the reverse SPF algorithm uses the cost towards the root rather than from the root. Expressed in cost terms, a node, Q, is in E's link-protecting Q-space with respect to the S-E link if $Dist\_Opt(Q, E) < Dist\_Opt(Q, S) + Dist\_Opt(S, E)$.

A set of link-protecting PQ nodes can be identified by calculating the intersection of S's link-protecting extended P-space with respect to the S-E link and E's link-protecting Q-space with respect to the S-E link. A link-protecting PQ node can be used as a remote LFA in case of a failure of the S-E link. Remote LFA FRR is described in more detail in draft-ietf-rtgwg-remote-lfa-04, which is hereby incorporated by reference.

The remote LFA computation described above finds a link-protecting PQ node that provides link protection for the S-E link. In other words, routing traffic through the link-protecting PQ node only guarantees that the traffic will not cross the S-E link. However, the link-protecting PQ node may not provide protection in case of a failure of the primary next hop node (i.e., node E). In other words, the link-protecting PQ node may not provide node protection.

For remote LFA to provide node protection, the repair tunnel endpoint needs to be a node in the network reachable from a neighbor of S without transiting E. In addition, the repair tunnel end point needs to be a node from which traffic will normally flow towards the destination without transiting E. This ensures that once traffic is released from the repair tunnel (i.e., at the repair tunnel endpoint), traffic will be forwarded, as normal, on the shortest path from the release point to its destination without transiting E.

A node-protecting repair tunnel endpoint can be computed by first determining the set of nodes that can be reached from a neighbor of S without transiting E and matching this set with E's link-protecting Q-space. This set of nodes is called the candidate node-protecting PQ space. A repair tunnel endpoint that is in the candidate node-protecting PQ space provides node protection for the path segment from S to the PQ node. However, there is no guarantee that the path segment from the PQ node to E is unaffected by the failure of E. To find a node-protecting remote LFA for a given destination, the computing router (i.e., S) should find a PQ node from the candidate node-protecting PQ-space for the corresponding primary next hop (i.e., E), such that the shortest path from the PQ node to the given destination remains unaffected in the event of the failure of E. To ensure this, the computing router will need to ensure that E should not be on any of the shortest paths from the PQ node to the given destination.

The set of nodes that can be reached from a neighbor of S (except E) without transiting E is called node S's node-protecting extended P-space with respect to node E (i.e., protects node E). This set must exclude any direct neighbors for which there is at least one ECMP path from the direct neighbor traversing node E. Expressed in cost terms, a node, Y, is in S's node-protecting extended P-space with respect to node E if $Dist\_Opt(N, Y) < Dist\_Opt(N, E) + Dist\_Opt(E, Y)$. All of the metrics needed by this inequality can be collected from the forward SPFs rooted at each of S's neighbors, computed as part of standard LFA.

The link-protecting Q-space of E with respect to the S-E link can be obtained by computing a reverse SPT rooted at E as described above in the link-protecting remote LFA computation scenario.

A set of candidate node-protecting PQ nodes can be identified by calculating the intersection of S's node-protecting extended P-space with respect to the node E and E's Q-space with respect to the S-E link.

To ensure that a shortest path from a candidate node-protecting PQ node to a given destination will not transit E, a PQ node needs to satisfy the inequality, $Dist\_Opt(Y, D) < Dist\_Opt(Y, E) + Dist\_Opt(E, D)$. The $Dist\_Opt(Y, E)$ and $Dist\_Opt(E, D)$ metrics can be obtained from the reverse SPF and the forward SPF rooted at E, run as part of the regular LFA and remote LFA implementations described above. The $Dist\_Opt(Y, D)$ metric can be obtained by computing an additional forward SPF rooted at each of the PQ nodes. A PQ node that satisfies this inequality can be used as a remote LFA in case of a failure of E. Node-protecting Remote LFA FRR is described in more detail in draft-psarkar-rtgwg-rlfa-node-protection-02, which is hereby incorporated by reference.

The disadvantage of the prior art include that the computation of node-protecting remote LFAs is inefficient. In particular, computing node-protecting remote LFAs involves a forward SPF from every PQ node, which is costly and is not scalable when there are a large number of PQ nodes. The embodiments described herein below improve the efficiency of computing node-protecting remote LFAs by avoiding computation of a forward SPF from every PQ node.

FIG. 1 is a flowchart of one embodiment of a process for computing node-protecting remote LFA in a network topology graph. The process efficiently computes node-protecting remote LFAs without performing forward SPF from PQ nodes. The operations in the flow diagrams will be described with reference to the exemplary embodiments of the other figures. The operations of the flow diagram may be performed by various components of the source node. However, one skilled in the art will understand that other nodes in the network can also perform the operations of the flow diagram from their respective perspectives. In one embodiment, the source node may be a router or network device or similar computing device. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process computes and stores primary paths (block 105). In one embodiment, the primary paths can be calculated using Djikstra's algorithm or any adequate SPF algorithm. The source node S will generally utilize the primary path when there are no detected failures in the network. In one embodiment, the next hops of the shortest path to each destination can be recorded in the source node's forwarding information base (FIB). In other embodiments, the primary paths have been previously calculated and stored. The set of destinations that are reachable from S on a primary path using a neighbor node E as a next hop is referred to herein as S-E destination nodes and E is referred to herein as the primary next hop for the set of S-E destination nodes. E is the protected node applicable to node protection of S-E destination nodes.

In one embodiment, the process also computes and stores standard LFA paths (block 110). The standard LFA paths to each destination can be computed using the process defined in RFC 5286. The next hops for each destination node can then be recorded in the source node's FIB to be utilized in the case of a failure associated with the next hop of the primary path. In other embodiments, the standard LFA paths have been previously calculated and stored.

The process computes a reverse SPF algorithm rooted at the primary next hop node (i.e., E), where the reverse SPF algorithm rooted at the primary next hop node maintains a reverse path of a shortest path computed by the reverse SPF algorithm rooted at the primary next hop node (block 115). A reverse SPF algorithm operates in a similar fashion to a forward SPF algorithm except the reverse SPF algorithm uses the cost towards the root rather than from the root. The reverse SPF algorithm yields the shortest path towards the root from other nodes in the network. In one embodiment, the reverse SPF algorithm maintains a reverse path of the shortest path computed by the reverse SPF algorithm by maintaining a link from a child node to a parent node on the shortest path computed by the reverse SPF algorithm.

The process selects a node that is in both the source node's node-protecting extended P-space that protects the primary next hop node and the primary next hop node's link-protecting Q-space that protects the S-E link (block 120). In one embodiment, the process can determine whether a particular node, Y, is in the source node's node-protecting extended P-space that protects the primary next hop node by checking if the node satisfies the inequality $Dist\_Opt(N, Y) < Dist\_Opt(N, E) + Dist\_Opt(E, Y)$. In one embodiment, some or all of the metrics needed by this inequality can be collected from the forward SPFs rooted at each of S's neighbors, computed as part of standard LFA. In one embodiment, the process can determine whether a particular node, Y, is in the primary next hop node's link-protecting Q-space that protects the S-E link by checking if the node satisfies the inequality $Dist\_Opt(Y, E) < Dist\_Opt(Y, S) + Dist\_Opt(S, E)$. In one embodiment, the $Dist\_Opt(Y, E)$ metric can be obtained from the reverse SPF algorithm rooted at E and the $Dist\_Opt(Y, S)$ metric can be obtained from a reverse SPF algorithm rooted at S. In one embodiment, the $Dist\_Opt(S, E)$ can be obtained from a forward SPF algorithm rooted at S, computed as part of the primary path calculation. In other embodiments, some or all of the metrics of this inequality have been pre-calculated and stored. In one embodiment, a node having a shortest distance from the source node from the set of nodes that are in both the source node's node-protecting extended P-space that protects the primary next hop and the primary next hop node's link protecting Q-space that protects the S-E link is selected.

The process traverses the reverse path of the shortest path computed by the reverse SPF algorithm rooted at the primary next hop node starting from the selected node and towards the primary next hop node (block 125) and assigns the selected node as a node-protecting remote LFA for each S-E destination node visited along the traversal of the reverse path that has not been assigned a node-protecting remote LFA (excluding E) (block 130). In one embodiment, the selected node is also assigned as a link-protecting remote LFA for the primary next hop node. In one embodiment, since the selected node is also a link-protecting PQ node, the selected node is assigned as a link-protecting remote LFA for all S-E destination nodes.

After performing the reverse SPF rooted at E and assigning node-protecting remote LFA(s) as described, it is possible that not all S-E destinations have been assigned a node-protecting remote LFA. If this is the case, a similar process can be run using a reverse SPF rooted at a chosen S-E destination (other than E) to compute node-protecting remote LFAs for other S-E destination nodes.

Returning to FIG. 1, the process checks if all S-E destination nodes are protected (decision block 135). If all S-E destination nodes are protected, then the process is finished. However, if all S-E destination nodes are not protected, the process selects a next node from the set of S-E destination nodes that has not been assigned a node-protecting remote LFA to serve as a root for a reverse SPF algorithm (block 140). In one embodiment, a node that is closest in distance from the source node from the set of S-E destination nodes that have not been assigned a node-protecting remote LFA is selected as the next node.

The process computes a reverse SPF algorithm rooted at the selected next node, where the reverse SPF algorithm rooted at the selected next node maintains a reverse path of a shortest path computed by the reverse SPF algorithm rooted at the selected next node (block 145).

The process selects an alternate node that is in both the source node's node-protecting extended P-space that protects the primary next hop node and the selected next node's node-protecting Q-space that protects the primary next hop node (block 150). The node-protecting Q-space for a given S-E destination node, D, with respect to the primary next hop node (i.e., E) is the set of nodes that can reach D on a shortest path without transiting E. In one embodiment, the process can determine whether a particular node, Y, is in the selected next node's node-protecting Q-space with respect to the primary next hop node by checking if the node satisfies the inequality $Dist\_Opt(Y, D) < Dist\_Opt(Y, E) + Dist\_Opt(E, D)$, where the selected next node is denoted as the destination D. In one embodiment, the $Dist\_Opt(Y, D)$ metric can be obtained from the reverse SPF algorithm rooted at the selected next node. In one embodiment, the Dist_Opt(Y, E) metric can be obtained from the reverse SPF algorithm rooted at the primary next hop node. In one embodiment, the Dist_Opt(E, D) metric can be obtained from a forward SPF rooted at E, which is computed as part of a standard LFA. In other embodiments, some or all of the metrics of this inequality have been pre-calculated and stored. In one embodiment, a node having a shortest distance from the source node from the set of nodes that are in both the source node's node-protecting extended P-space that protects the primary next hop node and the selected next node's node-protecting Q-space that protects the primary next hop node is selected as the alternate node.

The process traverses the reverse path of the shortest path computed by the reverse SPF algorithm rooted at the selected next node starting from the selected alternate node and towards the selected next node (block 155) and assigns the selected alternate node as a node-protecting remote LFA for each S-E destination node visited along the traversal of the reverse path that has not been assigned a node-protecting remote LFA (block 160).

The process checks if all S-E destination nodes are protected (decision block 165). If all S-E destination nodes are protected, then the process is finished. However, if all S-E destination nodes are not protected, the process described above may be repeated until all S-E destination nodes are protected or all S-E destination nodes have been considered.

Pseudo-code of one embodiment of maintaining a reverse path during a reverse SPF is described here:

During the reverse SPF from E (or S-E destination node D), mark every node's parent as below. To start with mark E/D's parent as NULL.

Whenever a node X tries to add node Y into the candidate list, Y's parent is marked as below.

1) If Y is not in the candidate list Y→Parent=X;
2) If Y is already in the candidate list,
   If calculated cost is less than existing cost of Y, Y→Parent=X;
   If calculated cost is greater than existing cost of Y, do nothing;
   If the calculated cost is equal to the existing cost of Y, Y→Parent=X;

Other techniques and data structures for keeping track of paths computed by graph traversal algorithms that are well-known to one having ordinary skill in the art are contemplated as well.

Pseudo-code for one embodiment of traversing the reverse path starting from the selected node, X, and towards the primary next hop node E (or S-E destination node D) is described here:

curNode=X;
While (curNode !=E/D) {
If curNode is an unprotected destination
    Assign X as node-protecting remote LFA for curNode;
    curNode=curNode→parent
}
If (curNode==E)
Assign X as link-protecting remote LFA for curNode;
Else
Assign X as node-protecting remote LFA for curNode;
Proof of the Validity of the Process The node-protecting remote LFAs assigned by the process described above are valid in the sense that the selected node, Y, is a node-protecting remote LFA for all unprotected destinations that are encountered in the shortest path from Y to E. This can be proven by proof of correctness by contradiction:

Assume that there exists an unprotected S-E destination, Di, in the network such that Y→D1→D2→ . . . →Di . . . →E is an optimal path. This means that:

claim 1) Dist_Opt(Y, E)=Dist_Opt(Y, Di)+Dist_Opt(Di, E); and claim 2) all link costs are positive.

For the purpose of proving by contradiction, assume that Y is not a node-protecting remote LFA of Di. In other words, the assumption is that the shortest path from Y to Di goes through E. Expressed in cost terms, the assumption is that Dist_Opt(Y, Di)=Dist_Opt(Y, E)+Dist_Opt(E, Di). Adding Dist_Opt(Di, E) on both sides of the equation results in Dist_Opt(X, E)=Dist_Opt(Y, E)+Dist_Opt(E, Di)+Dist_Opt(Di, E). From this equation, it follows that Dist_Opt(E, Di)+Dist_Opt(Di, E)=0, which contradicts claim 2 that all link costs are positive. Hence, this proves that Y is indeed a node-protecting remote LFA for all unprotected destinations encountered along the shortest path from Y to E. The proof is similar for when the reverse SPF is rooted at an S-E destination node.

FIGS. 2A-2D and FIG. 3 are diagrams of one embodiment of a network topology graph that demonstrate efficient computation of node-protecting remote LFAs. The example network topology graph is provided by way of example and not limitation to illustrate an embodiment of the node-protecting remote LFA computation process. One of ordinary skill in the art will understand that node-protecting remote LFA computation can be performed on other network topologies having a different configuration than the topology shown in the figures. The example network topology graph includes a source node (S), a neighbor node (N), a primary next hop node (E), and destination nodes (R1-R5). Computations are considered from the perspective of the source node. However, one skilled in the art will understand that other nodes in the network can make similar node-protecting remote LFA computations from their respective perspectives. The edges of the graph represent links between nodes. The link connecting R2 and R5 has a cost of 30 in both directions, while all other links have a cost of 10 in both directions. Each of the nodes can be any type of network device as defined herein. This example is used herein below with relation to the described embodiments. One skilled in the art would understand that the principles, processes, and structures described herein are applicable to any type of network having any number of network devices and in any configuration thereof.

Figure 2A:
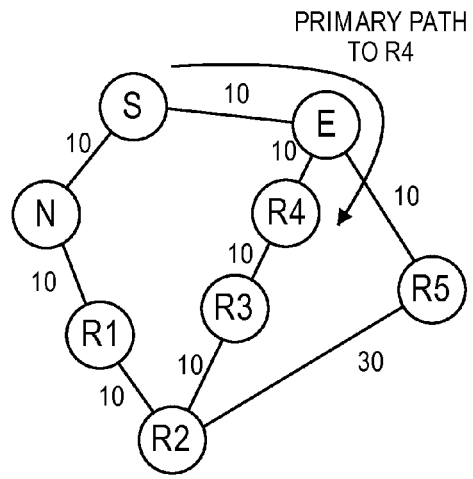
FIG. 2A is a diagram of one embodiment of a network topology graph showing a primary path from a source to a destination.

FIG. 2A is a diagram of one embodiment of a network topology graph showing a primary path from S to destination R4. When no failures are detected in the network, S will send traffic to destination R4 on a shortest path (S→E→R4).

Figure 2B:
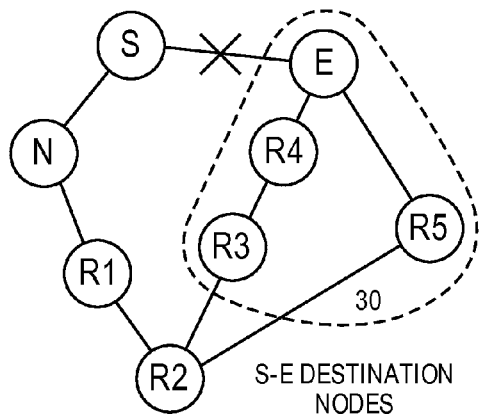
FIG. 2B is a diagram of one embodiment of a network topology graph showing a set of S-E destination nodes.

FIG. 2B is a diagram of one embodiment of a network topology graph showing a set of S-E destination nodes. As described above, the set of S-E destination nodes are the set of nodes that are reachable from S on a shortest path via E. In this network topology graph, the set of S-E destination nodes are E, R3, R4, and R5 since the shortest path from S to these nodes normally use E as a next hop. If the S-E link or E fails, S will need to switch to a backup path to reach the S-E destinations.

Figure 2C:
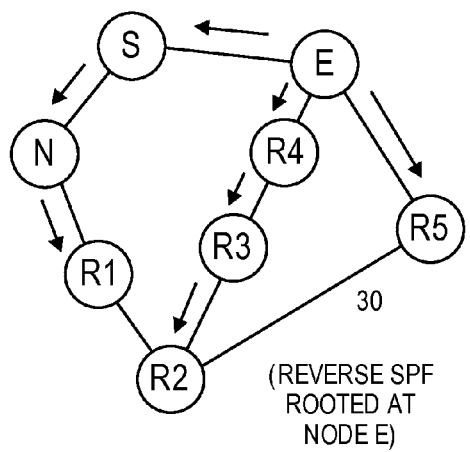
FIG. 2C is a diagram of one embodiment of a network topology graph showing a reverse SPT rooted at the primary next hop node as computed by a reverse SPF algorithm.

FIG. 2C is a diagram of one embodiment of a network topology graph showing a reverse SPT computed by a reverse SPF algorithm rooted at the primary next hop node. In this example, the reverse SPF algorithm computes a shortest path E→R4→R3→R2. According to one embodiment, the reverse SPF algorithm also maintains a reverse path of the shortest path. That is, the reverse SPF algorithm maintains a reverse path R2→R3→R4→E. This reverse path represents the shortest path from R2 to E. In the interest of conciseness, a shortest path and reverse path for one branch of the reverse SPT has been described here. However, one of ordinary skill in the art will understand that the reverse SPF algorithm can compute the shortest paths and maintain their respective reverse paths along other branches of the reverse SPT.

Figure 2D:
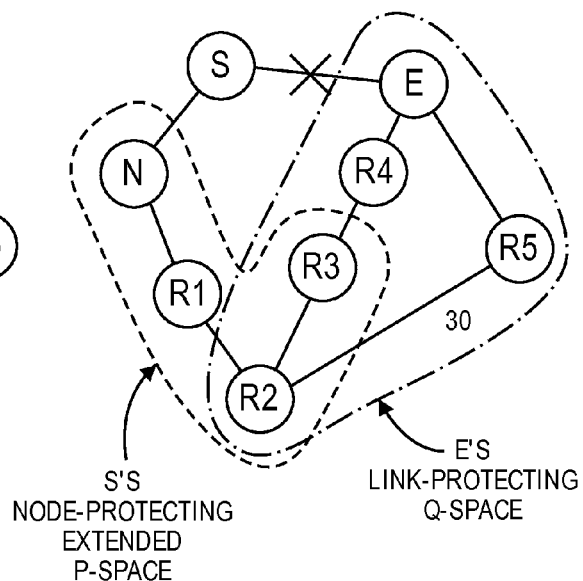
FIG. 2D is a diagram of one embodiment of a network topology graph showing the source node's node-protecting extended P-space with respect to the primary next hop node and the primary next hop node's link-protecting Q-space with respect to the S-E link.

FIG. 2D is a diagram of one embodiment of a network topology graph showing the source node's node-protecting extended P-space with respect to the primary next hop node and the primary next hop node's link-protecting Q-space with respect to the S-E link. The source node's node-protecting extended P-space includes nodes N, R1, R2, and R3. The primary next hop node's link-protecting Q-space with respect to the S-E link includes nodes R2, R3, R4, R5, and E. As such, the intersection of these two sets includes nodes R2 and R3. According to an embodiment, a node is selected from the intersection of these two sets and the selected node will be assigned as a node-protecting remote LFA for each S-E destination node visited along a traversal of the reverse path starting from the selected node and towards the primary next hop node. For purposes of this example, node R2 will be selected. According to one embodiment, the reverse path starting from R2 and towards E was previously maintained during computation of the reverse SPF rooted at E. This reverse path is R2→R3→R4→E. Thus, R2 will be assigned as a node-protecting remote LFA for nodes R3 and R4. An advantage here is that a node-protecting remote LFA has been found for R3 and R4 without having to perform any forward SPFs from PQ nodes. It should be noted that in this example network topology, node R3 can be protected by a regular LFA path via N. However, node R4 does not have protection through regular LFA so remote LFA is particularly applicable for node R4. Also, because R2 is a PQ node, R2 can also be assigned as a link-protecting remote LFA for all S-E destination nodes.

Figure 3:
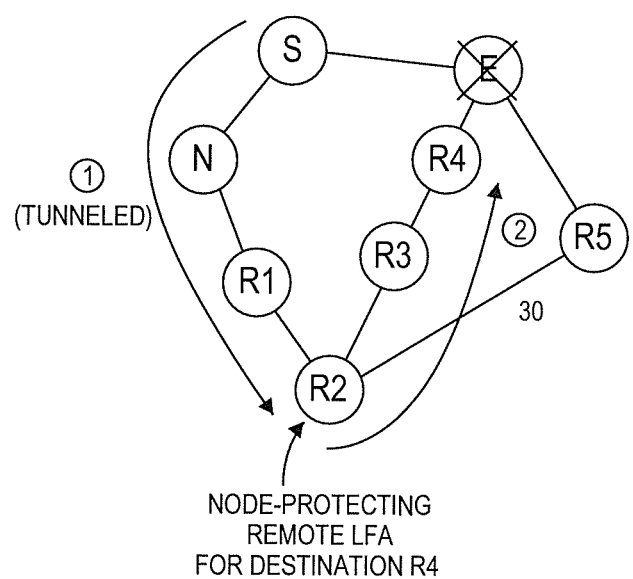
FIG. 3 is a diagram of one embodiment of a network topology graph showing how traffic can be routed through a node-protecting remote LFA in case of a failure of the primary next hop node.

FIG. 3 is a diagram of one embodiment of a network topology graph showing how traffic can be routed through a node-protecting remote LFA in case of a failure of the primary next hop node. When the primary next hop node (i.e, E) fails, the source node is not able to send traffic to destination R4 via E. However, in the above example, R2 has been assigned as a node-protecting remote LFA for destination R4. As such, in the event that E fails, S can send traffic to R4 using R2 as a node-protecting remote LFA. In one embodiment, S tunnels the traffic to R2 using N as a next hop. When the tunneled traffic is decapsulated at R2, the traffic will be forwarded to R4 on a primary path.

An advantage provided by the process described herein above is improved computational efficiency. The process performs less number of SPFs to find node-protecting remote LFAs. Also, while calculating link-protecting remote LFA, the process also identifies node-protecting remote LFA(s) for a subset of unprotected destinations with essentially no additional computational cost.

Figure 4:
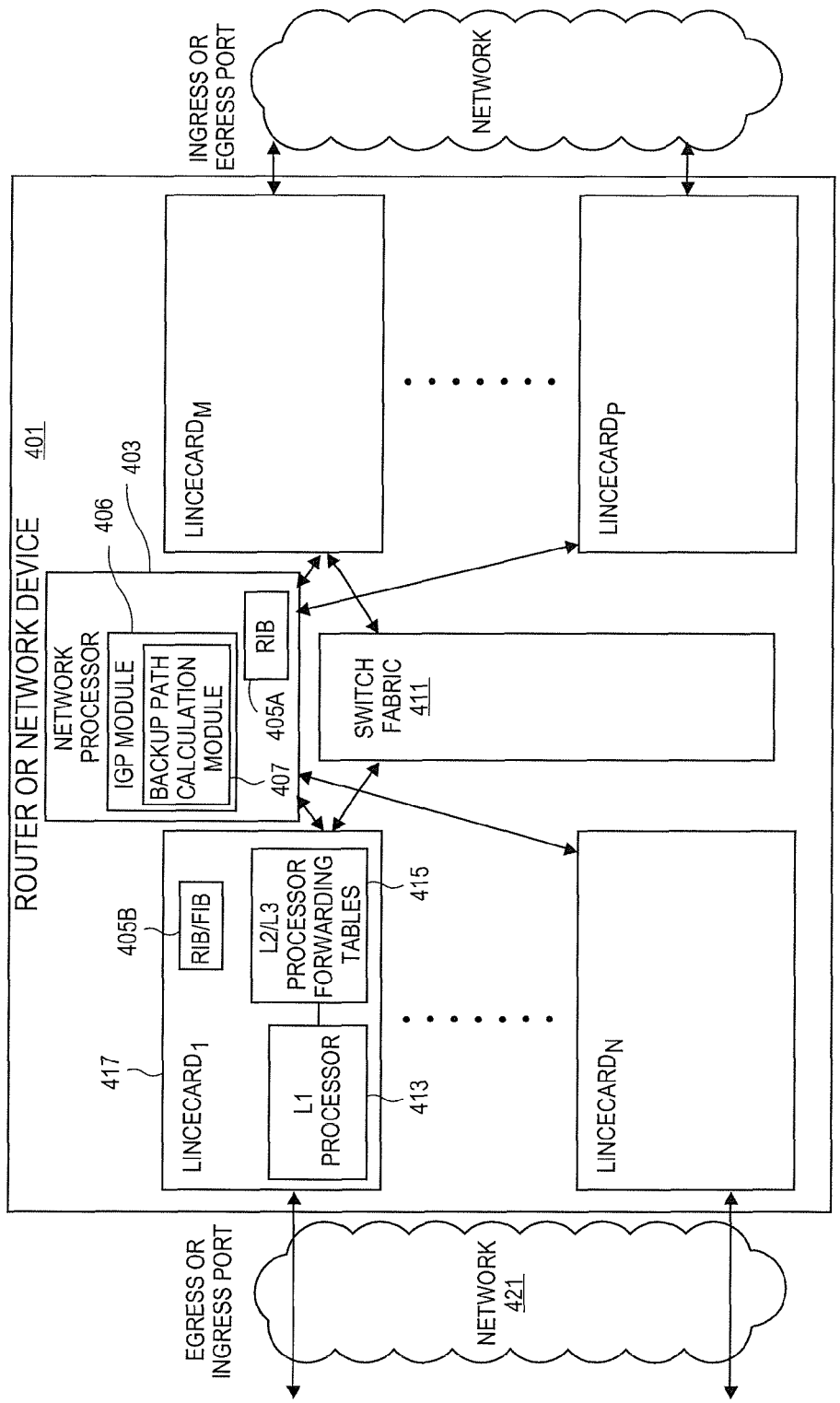
FIG. 4 is a diagram of one embodiment of a network device implementing the backup path calculation process.

FIG. 4 is a diagram of one embodiment of a network device implementing the backup path calculation process.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6:
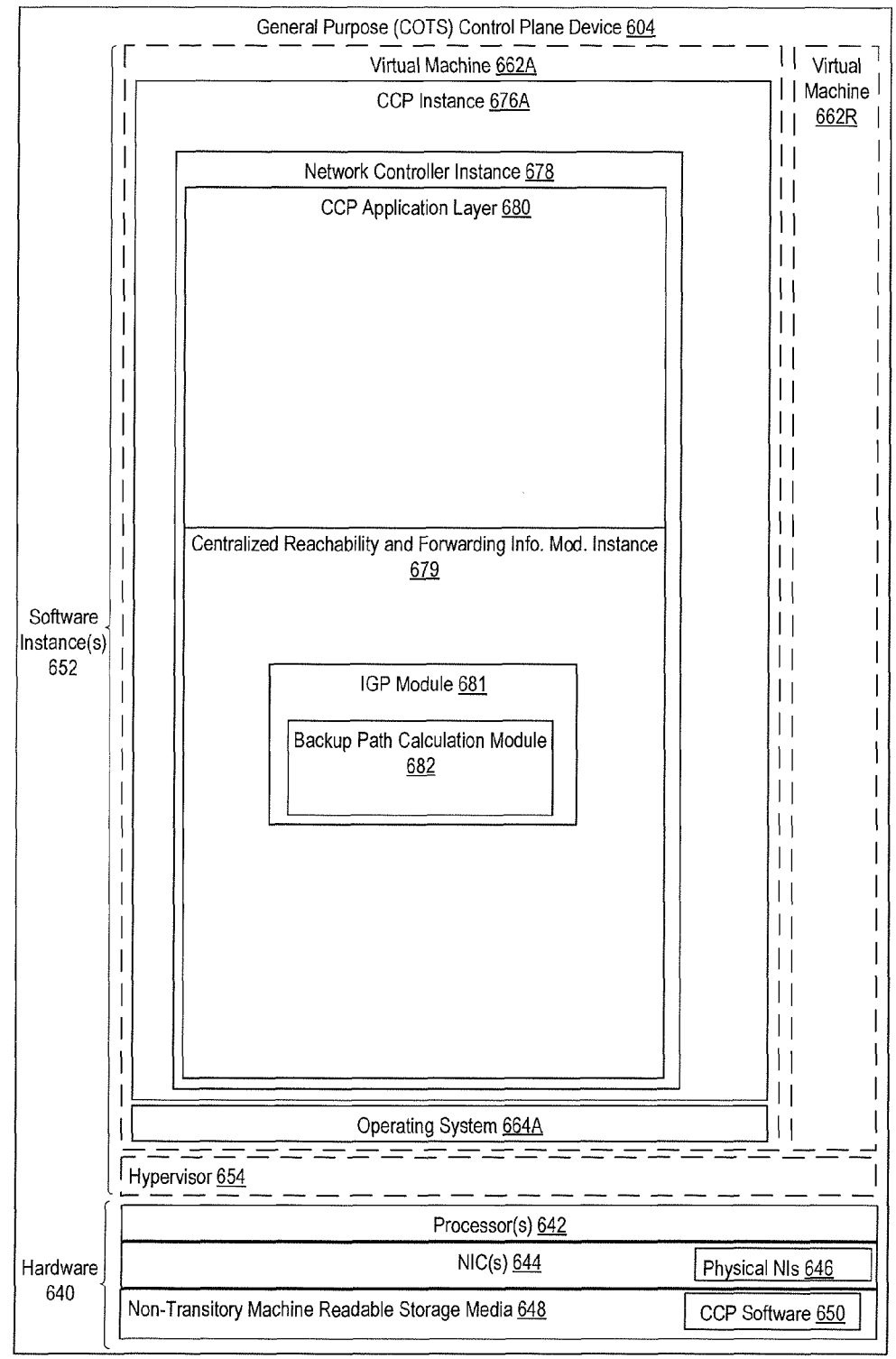
FIG. 6 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

In one embodiment, the process is implemented by a router 401 or network device or similar computing device. The router 401 can have any structure that enables it to receive data traffic and forward it toward its destination. The router 401 can include a network processor 403 or set of network processors that execute the functions of the router 401. A 'set,' as used herein with reference to FIGS. 4-6, is any positive whole number of items including one item. The router 401 or network device can execute backup path calculation functionality via a network processor 403 or other components of the router 401.

The backup path calculation process functions can be implemented as modules in any combination of software, including firmware, and hardware within the router. The functions of the backup path calculation process that are executed and implemented by the router 401 include those described further herein above.

In one embodiment, the router 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the backup path calculation process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the backup path calculation process can be carried out at any combination of the data plane nodes and the central controller.

The operations of the flow diagrams have been described with reference to the exemplary embodiment of the flow diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). The backup path calculation module 534A within the interior gateway protocol (IGP) module 533A implements the processes described herein above as part of the Control communication and Configuration Module 532A or similar aspect of the networking software, which may be loaded and stored in the non-transitory machine readable media 518A or in a similar location.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R. In one embodiment, the virtual machines 562A-R may execute the described backup path calculation module 563A and related software described herein above.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 562A-R differently. For example, while embodiments of the invention are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 6A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 606) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 5C illustrates various exemplary ways in which VNEs may be coupled according to some embodiments of the invention. FIG. 5C shows VNEs 570A.1-570A.P (and optionally VNEs 580A.Q-580A.R) implemented in ND 500A and VNE 570H.1 in ND 500H. In FIG. 6C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 604, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multi-protocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 172 can be implemented on the general purpose network device 504 and the hybrid network device 506.

FIG. 5D illustrates a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the IGP module 580 and backup path calculation module 581 and related software as described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 604.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 578 to the operating system 664A and communicating with the various NEs), and an CCP application layer 680 (sometimes referred to as an application layer) over the middleware layer (providing the intelligence required for various network operations such as protocols, network situational awareness, and user-interfaces). In one embodiment, the centralized reachability and forwarding information module 679 may include the IGP module 681 and backup path calculation module 682 and related software as described herein above. At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node, the method comprising the steps of:
computing a reverse shortest path first (SPF) algorithm rooted at the primary next hop node, wherein the reverse SPF algorithm rooted at the primary next hop maintains a reverse path of a shortest path computed by the reverse SPF algorithm rooted at the primary next hop node;
selecting a node that is in both the source node's node-protecting extended P-space that protects the primary next hop node and the primary next hop node's link-protecting Q-space that protects the S-E link;
traversing the reverse path of the shortest path computed by the reverse SPF algorithm rooted at the primary next hop node starting from the selected node and towards the primary next hop node; and
assigning the selected node as a node-protecting remote LFA for each S-E destination node visited along the traversal of the reverse path that has not been assigned a node-protecting remote LFA.

2. The method of claim 1, further comprising the step of:
assigning the selected node as a link-protecting remote LFA for the primary next hop node.

3. The method of claim 1, wherein the reverse SPF algorithm rooted at the primary next hop node maintains the reverse path of the shortest path computed by the reverse SPF algorithm rooted at the primary next hop by maintaining a link from a child node to a parent node on the shortest path computed by the reverse SPF algorithm rooted at the primary next hop node.

4. The method of claim 1, further comprising the step of:
assigning the selected node as a link-protecting remote LFA for all S-E destination nodes in the network topology graph.

5. The method of claim 1, further comprising the steps of:
computing an SPF algorithm rooted at the source node as part of a primary path calculation; and
computing an SPF algorithm rooted at each neighbor of the source node as part of a standard LFA calculation.

6. The method of claim 1 further comprising the steps of:
selecting a next node from the set of S-E destination nodes that has not been assigned a node-protecting remote LFA to serve as a root for a reverse SPF algorithm;
computing a reverse SPF algorithm rooted at the selected next node, wherein the reverse SPF algorithm rooted at the selected next node maintains a reverse path of a shortest path computed by the reverse SPF algorithm rooted at the selected next node;
selecting an alternate node that is in both the source node's node-protecting extended P-space that protects the primary next hop node and the selected next node's node-protecting Q-space that protects the primary next hop node;
traversing the reverse path of the shortest path computed by the reverse SPF algorithm rooted at the selected next node starting from the selected alternate node and towards the selected next node; and
assigning the selected alternate node as a node-protecting remote LFA for each S-E destination node visited along the traversal of the reverse path that has not been assigned a node-protecting remote LFA.

7. The method of claim 6, wherein the selected next node is a node that is closest in distance from the source node from the set of S-E destination nodes that have not been assigned a node protecting remote LFA.

8. The method of claim 6, wherein selecting the alternate node further comprises the steps of:
identifying a set of nodes that are in both the source node's node-protecting extended P-space that protects the primary next hop node and the selected next node's node-protecting Q-space that protects the primary next hop node; and
selecting a node having a shortest distance from the source node from the set of nodes that are in both the source node's node-protecting extended P-space that protects the primary next hop node and the selected next node's node-protecting Q-space that protects the primary next hop node.

9. The method of claim 6, wherein the reverse SPF algorithm rooted at the selected next node maintains the reverse path of the shortest path computed by the reverse SPF algorithm by maintaining a link from a child node to a parent node on the shortest path computed by the reverse SPF algorithm rooted at the selected next node.

10. The method of claim 6, further comprising the step of:
forwarding, via a tunnel, a packet destined for an S-E destination node to a node protecting remote LFA assigned to the S-E destination node.

11. A network device executing a method to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node, the primary next hop node having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node, the network device comprising:

a forwarding element to forward data traffic towards a primary next hop node until a network event and to forward the data traffic towards the node-protecting remote LFA after the network event; and a network processor coupled to the at least one forwarding element, the network processor configured to execute a backup path calculation module, the backup path calculation module configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

12. The network device of claim 11, wherein the network processor is further configured to assign the selected node as a link-protecting remote LFA for the primary next hop node.

13. The network device of claim 11, wherein the network processor is further configured to identify a set of nodes that are in the source node's node-protecting extended P-space that protects the primary next hop and the primary next hop node's link-protecting Q-space that protects the S-E link and to select a node having a shortest distance from the source node from the set of nodes that are in the source node's node-protecting extended P-space that protects the primary next hop and the primary next hop node's link-protecting Q-space that protects the S-E link as the selected node.

14. The network device of claim 11, wherein the network processor is further configured to maintain a link from a child node to a parent node on the shortest path computed by the reverse SPF algorithm rooted at the primary next hop node.

15. The network device of claim 11, wherein the forwarding element is further configured to forward, via a tunnel, a packet destined for an S-E destination node to a node protecting remote LFA assigned to the S-E destination node.

16. The network device of claim 11, wherein the network processor is further configured to compute an SPF algorithm rooted at the source node as part of a primary path calculation and to compute an SPF algorithm rooted at each neighbor of the source node as part of a standard LFA calculation.

17. The network device of claim 11, wherein the network processor is further configured to select a next node from the set of S-E destination nodes that has not been assigned a node-protecting remote LFA to serve as a root for a reverse SPF algorithm, to compute a reverse SPF algorithm rooted at the selected next node, where the reverse SPF algorithm rooted at the selected next node maintains a reverse path of a shortest path computed by the reverse SPF algorithm rooted at the selected next node, to select an alternate node that is in both the source node's node-protecting extended P-space that protects the primary next hop node and the selected next node's node-protecting Q-space that protects the primary next hop node, to traverse the reverse path of the shortest path computed by the reverse SPF algorithm rooted at the selected next node starting from the selected alternate node and towards the selected next node, and to assign the selected alternate node as a node-protecting remote LFA for each S-E destination node visited along the traversal of the reverse path that has not been assigned a node-protecting remote LFA.

18. The network device of claim 17, wherein the selected next node is a node that is closest in distance from the source node from the set of S-E destination nodes that have not been assigned a node protecting remote LFA.

19. The network device of claim 17, wherein the network processor is further configured to maintain a link from a child node to a parent node on the shortest path computed by the reverse SPF algorithm rooted at the selected next node.

20. A non-transitory computer readable medium having instructions stored therein, which when executed causes a network device to compute a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node, the execution to cause the network device to perform a set of operations comprising the steps of:

computing a reverse shortest path first (SPF) algorithm rooted at the primary next hop node, wherein the reverse SPF algorithm rooted at the primary next hop maintains a reverse path of a shortest path computed by the reverse SPF algorithm rooted at the primary next hop node;

selecting a node that is in both the source node's node-protecting extended P-space that protects the primary next hop node and the primary next hop node's link-protecting Q-space that protects the S-E link;

traversing the reverse path of the shortest path computed by the reverse SPF algorithm rooted at the primary next hop node starting from the selected node and towards the primary next hop node; and assigning the selected node as a node-protecting remote LFA for each S-E destination node visited along the traversal of the reverse path that has not been assigned a node-protecting remote LFA.

21. The non-transitory computer readable medium of claim 20, having instructions stored therein, which when executed causes the network device to perform a further set of operations comprising the steps of:
selecting a next node from the set of S-E destination nodes that has not been assigned a node-protecting remote LFA to serve as a root for a reverse SPF algorithm;
computing a reverse SPF algorithm rooted at the selected next node, wherein the reverse SPF algorithm rooted at the selected next node maintains a reverse path of a shortest path computed by the reverse SPF algorithm rooted at the selected next node;
selecting an alternate node that is in both the source node's node-protecting extended P-space that protects the primary next hop node and the selected next node's node-protecting Q-space that protects the primary next hop node;
traversing the reverse path of the shortest path computed by the reverse SPF algorithm rooted at the selected next node starting from the selected alternate node and towards the selected next node; and
assigning the selected alternate node as a node-protecting remote LFA for each S-E destination node visited along the traversal of the reverse path that has not been assigned a node-protecting remote LFA.

22. A control plane device configured to implement at least one centralized control plane for a software defined network (SDN), the centralized control plane configured to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node, the control plane device comprising:
a non-transitory storage medium to store centralized control plane software, a backup path calculation module and a local routing information base (RIB); and
a processor communicatively coupled to the non-transitory storage medium, the processor configured to execute the control plane software, the control plane software to implement the backup path calculation module, the backup path calculation module configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

23. The control plane device of claim 22, wherein the backup path calculation module is further configured to select a next node from the set of S-E destination nodes that has not been assigned a node-protecting remote LFA to serve as a root for a reverse SPF algorithm, to compute a reverse SPF algorithm rooted at the selected next node, where the reverse SPF algorithm rooted at the selected next node maintains a reverse path of a shortest path computed by the reverse SPF algorithm rooted at the selected next node, to select an alternate node that is in both the source node's node-protecting extended P-space that protects the primary next hop node and the selected next node's node-protecting Q-space that protects the primary next hop node, to traverse the reverse path of the shortest path computed by the reverse SPF algorithm rooted at the selected next node starting from the selected alternate node and towards the selected next node, and to assign the selected alternate node as a node-protecting remote LFA for each S-E destination node visited along the traversal of the reverse path that has not been assigned a node-protecting remote LFA.

24. A computing device implementing a plurality of virtual machines for implementing network function virtualization (NFV), wherein a virtual machine from the plurality of virtual machines is configured to improve efficiency of computing a node-protecting remote loop-free alternate (LFA) in a network topology graph, the network topology graph including a source node (S), a primary next hop node (E), and a set of S-E destination nodes, where an S-E destination node is a node that is reachable from the source node on a shortest path via the primary next hop node, the source node having a node-protecting extended P-space that protects the primary next hop node, where the source node's node-protecting extended P-space that protects the primary next hop node is a set of nodes that are reachable on a shortest path from a neighbor node of the source node, excluding the primary next hop node, without transiting the primary next hop node E, the primary next hop node E having a link-protecting Q-space that protects a link connecting the source node and the primary next hop node (S-E link), where the primary next hop node's link-protecting Q-space that protects the S-E link is a set of nodes that can reach the primary next hop node on a shortest path without transiting the S-E link, the node-protecting remote LFA to provide an alternate route for the source node to reach an S-E destination node in case of a failure of the primary next hop node, the computing device comprising:
a non-transitory storage medium to store a backup path calculation module and a local routing information base (RIB); and
a processor communicatively coupled to the non-transitory storage medium, the processor configured to execute the virtual machine, where the virtual machine is configured to implement the backup path calculation module, the backup path calculation module configured to compute a reverse shortest path first (SPF) algorithm rooted at the primary next hop node, where the reverse SPF algorithm rooted at the primary next hop node maintains a reverse path of a shortest path computed by the reverse SPF algorithm rooted at the primary next hop node, to select a node that is in both the source node's node-protecting extended P-space that protects the primary next hop node and the primary next hop node's link-protecting Q-space that protects the S-E link, to traverse the reverse path of the shortest path computed by the reverse SPF algorithm rooted at the primary next hop node starting from the selected node and towards the primary next hop node, and to assign the selected node as a node-protecting remote LFA for each S-E destination node visited along the traversal of the reverse path that has not been assigned a node-protecting remote LFA.

25. The computing device of claim 24, wherein the backup path calculation module is further configured to select a next node from the set of S-E destination nodes that has not been assigned a node-protecting remote LFA to serve as a root for a reverse SPF algorithm, to compute a reverse SPF algorithm rooted at the selected next node, where the reverse SPF algorithm rooted at the selected next node maintains a reverse path of a shortest path computed by the reverse SPF algorithm rooted at the selected next node, to select an alternate node that is in both the source node's node-protecting extended P-space that protects the primary next hop node and the selected next node's node-protecting Q-space that protects the primary next hop node, to traverse the reverse path of the shortest path computed by the reverse SPF algorithm rooted at the selected next node starting from the selected alternate node and towards the selected next node, and to assign the selected alternate node as a node-protecting remote LFA for each S-E destination node visited along the traversal of the reverse path that has not been assigned a node-protecting remote LFA.

* * * * *

UNITED STATES PATENT AND TRADEMARK OFFICE
CERTIFICATE OF CORRECTION

| | | |
|---|---|---|
| PATENT NO. | : 9,225,629 B2 | Page 1 of 1 |
| APPLICATION NO. | : 14/292516 | |
| DATED | : December 29, 2015 | |
| INVENTOR(S) | : Lindem, III et al. | |

It is certified that error appears in the above-identified patent and that said Letters Patent is hereby corrected as shown below:

Specification

In Column 5, Line 58, delete "software)," and insert -- software, --, therefor.

Signed and Sealed this
Nineteenth Day of April, 2016

Michelle K. Lee
*Director of the United States Patent and Trademark Office*